(12) United States Patent
Prater et al.

(10) Patent No.: US 6,603,640 B1
(45) Date of Patent: Aug. 5, 2003

(54) DUAL ACTUATOR PIVOT BEARING SYSTEM AND METHOD FOR MAKING THE SAME

(75) Inventors: Walter L. Prater, San Jose, CA (US); Ambrish A. Misra, Milpitas, CA (US); Miguel Dominguez, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 09/615,171

(22) Filed: Jul. 13, 2000

(51) Int. Cl.$^7$ ................................................. G11B 5/55
(52) U.S. Cl. ................................. 360/265.6; 360/264.4
(58) Field of Search ......................... 360/264.4, 264.7, 360/265.2, 265.4, 265.6

(56) References Cited

U.S. PATENT DOCUMENTS

| | | | | |
|---|---|---|---|---|
| 4,544,972 A | * | 10/1985 | Kogure et al. | 360/246.7 |
| 5,134,532 A | * | 7/1992 | Svendsen et al. | 360/264.4 |
| 5,341,569 A | | 8/1994 | Takamizawa et al. | |
| 5,509,198 A | | 4/1996 | Takamizawa et al. | |
| 5,539,597 A | * | 7/1996 | Blanks | 360/265.6 |
| 5,761,007 A | * | 6/1998 | Price et al. | 360/264.4 |
| 5,805,386 A | * | 9/1998 | Faris | 360/264.4 |
| 5,867,348 A | * | 2/1999 | Suwa | 360/265.2 |
| 5,999,373 A | * | 12/1999 | Allsup et al. | 360/265.6 |
| 6,018,441 A | * | 1/2000 | Wu et al. | 360/265.6 |

* cited by examiner

Primary Examiner—David L. Ometz (57) ABSTRACT

A dual actuator pivot bearing system and method for making the same is disclosed, wherein the need for adhesive bonding is eliminated and assembly time is minimized. The dual actuator pivot includes a first and a second actuator bearing assembly that include an upper sleeve having an upper and lower ball bearing press fitted into the upper sleeve to form the first actuator bearing assembly and a lower sleeve having an upper ball bearing press fitted into the sleeve to form the second actuator bearing assembly, the first and second actuator bearing assemblies being press fitted to a shaft assembly comprising a shaft having a ball bearing press fitted at a shaft base. The first and second actuator bearing assemblies are press fitted using a predetermined axial load that is tuned to select a desired resonance frequency for the first and second actuator bearing assemblies. The shaft may also include steps selected to have diameters matching bearing bore diameters graded from large to small going from a first end of the shaft to a second end of the shaft. Further, the shaft may be chilled to shrink the shaft. Alternatively, the components may be heated.

20 Claims, 12 Drawing Sheets

DUAL ACTUATOR PIVOT BEARING SYSTEM AND METHOD FOR MAKING THE SAME

BACKGROUND OF THE INVENTION

1. Field of the Invention

This invention relates in general to a mass storage systems for computer systems, and more particularly to an improved dual actuator pivot bearing system and method for making the same.

2. Description of Related Art

Fixed magnetic disk system, typically referred to as "hard" disk drives, are now commonplace as the main non-volatile storage in modern personal computers, workstations, and portable computers. Such hard disk drives are now capable of storing gigabyte quantities of digital data, even when implemented in portable computers of the so-called "notebook" class. Many important advances have been made in recent years that have enabled higher data density and thus larger storage capacities of hard disk drives, and that have also enabled much faster access speeds, both in the bandwidth of data communicated to and from the hard disk drive, and also in the access time of specified disk sectors. Advances have also been made that have greatly reduced the size and weight of hard disk drives, particularly as applied to portable computers, have been made over recent years. These advances have resulted in the widespread availability of ultra-light portable computers, yet having state-of-the art capability and performance.

A head/disk assembly typically comprises one or more commonly driven magnetic disks rotatable about a common spindle and cooperating with at least one head actuator for moving a plurality of heads radially relative to the disks so as to provide for the reading and/or writing of data on selected circular tracks provided on the disks. As track pitch decreases, servo performance will decrease because of the more stringent tracking criteria unless a break is made with current disk drive design. One proposal has been to put two independently controlled actuators on one disk drive. Servo performance is then increased because one actuator can seek to a new location while the second actuator is accessing data. In this way the seek and settle time is hidden from the user: he sees instead only the final portion of the seek that occurs when the data access on the other actuator has completed.

However, prior designs for dual actuator pivots have present several manufacturing problems. One problem with prior dual actuator pivot designs is that they have twice as many sleeves and ball bearings as a standard pivot. Outgassing potential is doubled because ball bearings are adhesively bonded to the shaft and sleeve. In addition, with twice as many adhesive joints the risk is doubled of having an adhesive bond fail with catastrophic results to the file. Yet another problem is the assembly time. Because a dual actuator pivot requires the assembly steps equivalent to two pivots, it naturally take twice as long to assemble.

It can be seen then that there is a need for a dual actuator pivot bearing system and method for making the same, wherein the need for adhesive bonding is eliminated and assembly time is minimized.

SUMMARY OF THE INVENTION

To overcome the limitations in the prior art described above, and to overcome other limitations that will become apparent upon reading and understanding the present specification, the present invention discloses an improved dual actuator pivot bearing system.

The present invention solves the above-described problems by press fitting the components of a dual actuator pivot bearing system, including the bearings, shaft and sleeves so that the need for adhesive bonding is eliminated and assembly time is minimized.

A system in accordance with the principles of the present invention includes at least one rotatable disk, at least first and second separately movable heads for providing transducing action with respect to the disk, first and second head actuators, wherein the first head actuator provides radial movement of said first head relative to said disk and said second actuator provides radial movement of said second head relative to said disk, the radial movement provided by each actuator being separately controllable from that of the other actuator, a dual actuator pivot for mounting the first and second actuators, the dual actuator pivot further comprising a first and a second actuator bearing assembly press fitted to a shaft, for rotatably securing the first and second head actuators respectively and at least one controller, operatively coupled to the first and second head actuators for controlling the movement of the first and second head actuators about the dual actuator pivot, the at least one controller producing control signals to control the movement of the first and second actuators.

Other embodiments of a system in accordance with the principles of the invention may include alternative or optional additional aspects. One such aspect of the present invention is that the first and a second actuator bearing assemblies further comprise an upper sleeve having an upper and lower ball bearing press fitted into a top and bottom bore of the upper sleeve respectively to form the first actuator bearing assembly and a lower sleeve having an upper ball bearing press fitted into a top bore of the sleeve to form the second actuator bearing assembly, the first and second actuator bearing assemblies being press fitted to a shaft assembly comprising a shaft having a ball bearing press fitted at a shaft base.

Another aspect of the present invention is that the system further includes a spacer disposed between the first and second actuator bearing assemblies.

Another aspect of the present invention is that the first and second actuator bearing assemblies are press fitted using a predetermined axial load.

Another aspect of the present invention is that the predetermined axial load is tuned to select a desired resonance frequency for the first and second actuator bearing assemblies.

Another aspect of the present invention is that the shaft comprises steps.

Another aspect of the present invention is that the steps are selected to have diameters matching bearing bore diameters graded from large to small going from a first end of the shaft to a second end of the shaft.

Another aspect of the present invention is that the steps match bearing bore diameters graded from large to small going from the bottom to the top of the shaft so that the bearings at the bottom of the shaft do not produce high frictional forces against the full length of the shaft during assembly.

Another aspect of the present invention is that the shaft is a flangeless shaft comprising large diameter areas formed at a first and second end of the shaft and a reduced diameter area between the large diameter areas.

Another aspect of the present invention is that the large diameter areas provide a interference press fit with the upper ball bearing press fitted into the top bore of the upper sleeve and with the ball bearing press fitted at the shaft base and provide a snug slip fit at the reduced diameter area for the lower ball bearing press fitted into the bottom bore of the upper sleeve and the upper ball bearing press fitted into a top bore of the lower sleeve.

In another embodiment of the present invention, a dual actuator pivot is provided. The dual actuator pivot includes a first and a second actuator bearing assembly press fitted to a shaft for rotatably securing the first and second head actuators respectively.

In another embodiment of the present invention, a method for forming a dual actuator pivot is provided. The method includes press fitting a first ball bearing onto a shaft to make a subassembly, press fitting a second ball bearing into a top bore of a first sleeve to make subassembly, press fitting a third ball bearing into a bottom bore of a second sleeve and press fitting a fourth ball bearing into a top bore of the second sleeve to make a subassembly, stacking on the shaft subassembly the first sleeve subassembly, a spacer, and second sleeve subassembly and applying an axial load to the first sleeve subassembly, a spacer, and second sleeve subassembly to press fit the first sleeve subassembly, a spacer, and second sleeve subassembly to the shaft assembly to form a complete dual actuator pivot assembly.

Another aspect of the present invention is that the method further includes vibrating the complete dual actuator pivot assembly at a low amplitude simultaneously while applying the axial load.

Another aspect of the present invention is that the method further including measuring the frequency spectrum for the vibrating complete dual actuator pivot assembly to obtain a resonance frequency for the first sleeve subassembly and for the second sleeve subassembly.

Another aspect of the present invention is that the method further includes adjusting the axial load while measuring the frequency spectrum for the vibrating complete dual actuator pivot assembly to select a desired resonance frequency for the first sleeve subassembly and for the second sleeve subassembly.

Another aspect of the present invention is that the method further includes chilling the shaft assembly before stacking on the shaft subassembly the first sleeve subassembly, a spacer, and second sleeve subassembly.

Another aspect of the present invention is that the method further includes heating the first sleeve subassembly, a spacer, and second sleeve subassembly before stacking on the shaft subassembly.

Another aspect of the present invention is that the method further includes initially forming steps on the shaft, wherein the steps are formed to have diameters matching bearing bore diameters graded from large to small going from a first end of the shaft to a second end of the shaft.

Another aspect of the present invention is that the steps match bearing bore diameters graded from large to small going from the bottom to the top of the shaft so that the bearings at the bottom of the shaft do not produce high frictional forces against the full length of the shaft during assembly.

Another aspect of the present invention is that the method further includes initially forming a flangeless shaft comprising large diameter areas formed at a first and second end of the shaft and a reduced diameter area between the large diameter areas.

Another aspect of the present invention is that the large diameter areas provide a interference press fit with the fourth ball bearing press fitted into the top bore of the second sleeve and with the first ball bearing press fitted at the shaft base and provide a snug slip fit at the reduced diameter area for the third ball bearing press fitted into the bottom bore of the second sleeve and the second ball bearing press fitted into a top bore of the first sleeve.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an improved dual actuator pivot bearing system and method for making the same. The components of the dual actuator pivot bearing, including the bearings, shaft and sleeves, are press fitted together so that the need for adhesive bonding is eliminated and assembly time is minimized.

Figure 1:
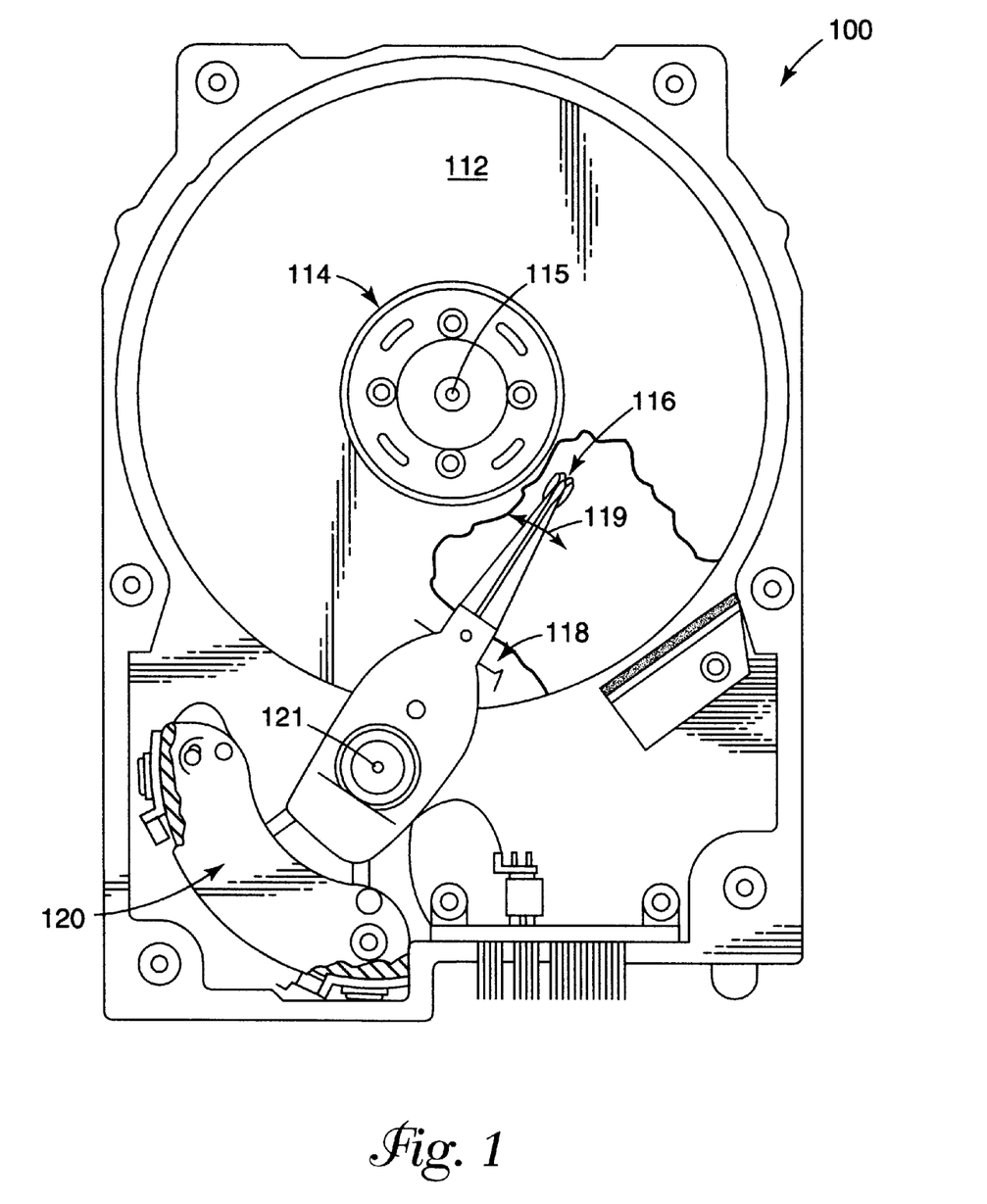
FIG. 1 is a top view of a disk drive.
Figure 4:
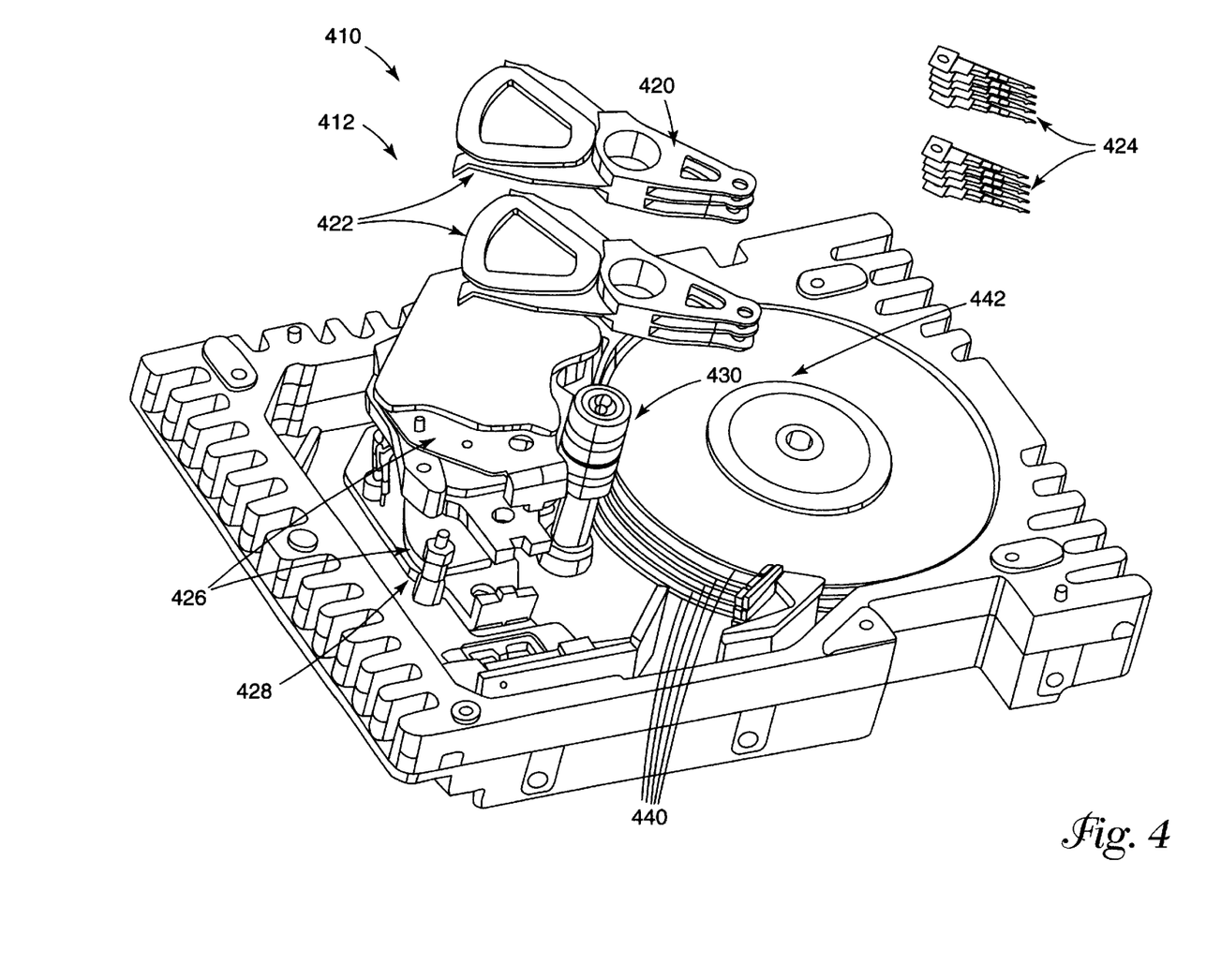
FIG. 4 illustrates a perspective view of a disk drive having two head actuators according to the present invention.

FIG. 1 is a top view of a disk drive 100 showing the operating components thereof. Disk drive 100 includes a disk pack 112, which is mounted on a spindle motor (not shown) by a disk clamp 114. Disk pack 112, in one preferred embodiment, includes a plurality of individual disks which are mounted for co-rotation about a central axis 115. Each disk surface on which data is stored has an associated head gimbal assembly (HGA) 116. Each head gimbal assembly is mounted to an actuator assembly 118 in disk drive 100. According to the present invention, the actuator assembly shown in FIG. 1 is of the type known as a rotary moving coil actuator and includes a plurality of voice coil motors (VCM) shown generally at 120 that rotate a plurality of actuator assemblies 118 with attached HGAs 116 about a pivot axis 121 to position HGAs 116 over desired data tracks on the associated disk surfaces, under the control of electronic circuitry housed within disk drive 100. FIG. 4, discussed in detail below, illustrates more clearly the plurality of actuator assemblies 118.

However, with respect to FIG. 1, actuator assemblies 118 pivot about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal which resiliently supports a slider relative to a load beam so that the slider can follow the topography of the disk. The slider, in turn, includes a transducer which is utilized for encoding flux reversals on, and reading flux reversals from, the surface of the disk over which it is flying.

Figure 2:
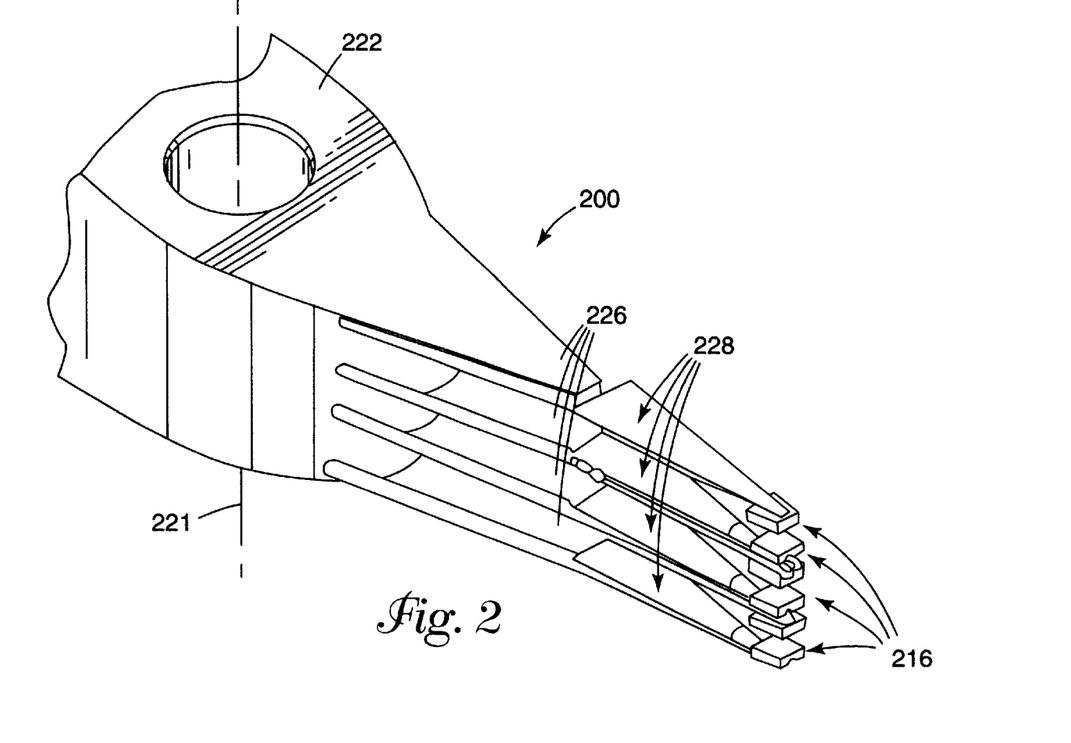
FIG. 2 is a perspective view of an actuator assembly.

FIG. 2 is a perspective view of an actuator assembly 200 as can be used in the disk drive illustrated in FIG. 1. Actuator assembly 200 includes base portion 222, a plurality of actuator arms 226, a plurality of load beams 228, and a plurality of head gimbal assemblies 216. Base portion 222 includes a bore which is, in the preferred embodiment, coupled for pivotal movement about axis 221. Actuator arms 226 extend from base portion 222 and are each coupled to the first end of either one or two load beams 228. Load beams 228 each have a second end which is coupled to a head gimbal assembly 216. According to the present invention, multiple, independently controlled actuator assemblies 200 are provided in a disk drive.

Figure 3:
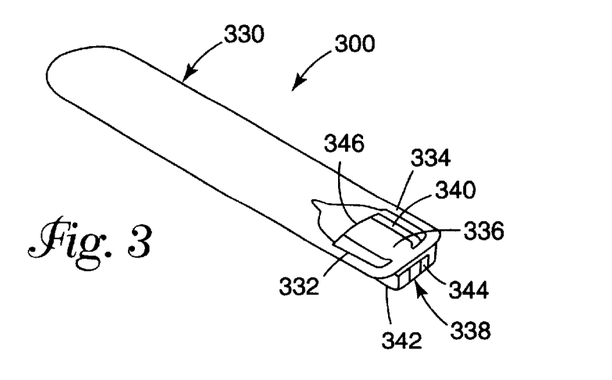
FIG. 3 illustrates a greatly enlarged view of a head gimbal assembly.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338 which has an upper surface 340 and a lower, air bearing surface 342. Transducers 344 are also preferably located on a trailing edge of slider 338. The particular attachment between slider 338 and gimbal 330 is accomplished in any desired manner. For example, a compliant sheer layer may be coupled between the upper surface 340 of slider 338 and a lower surface of gimbal bond tongue 336, with an adhesive. A compliant sheer layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

FIG. 4 illustrates a perspective view of a disk drive 400 wherein the two head actuators 410, 412 are mounted to a dual actuator pivot bearing system 430 according to the present invention . In FIG. 4, the head actuators 410, 412 include actuator combs 420, voice coil motor coils 422 and head gimbal assemblies (HGAs) 424. The head actuators 410, 412 are positioned by applying a control signal to the voice coil motor coils 422, which then move in response to the interaction with the dual magnets 426. A crash stop 428 is provided to limit the range of motion for the head actuators 410, 412. The head actuators 410, 412 are mounted to a dual actuator pivot bearing system 430 according to the present invention. The head actuators 410, 412 are moved relative to disks 440 in disk stack 442.

Figure 5:
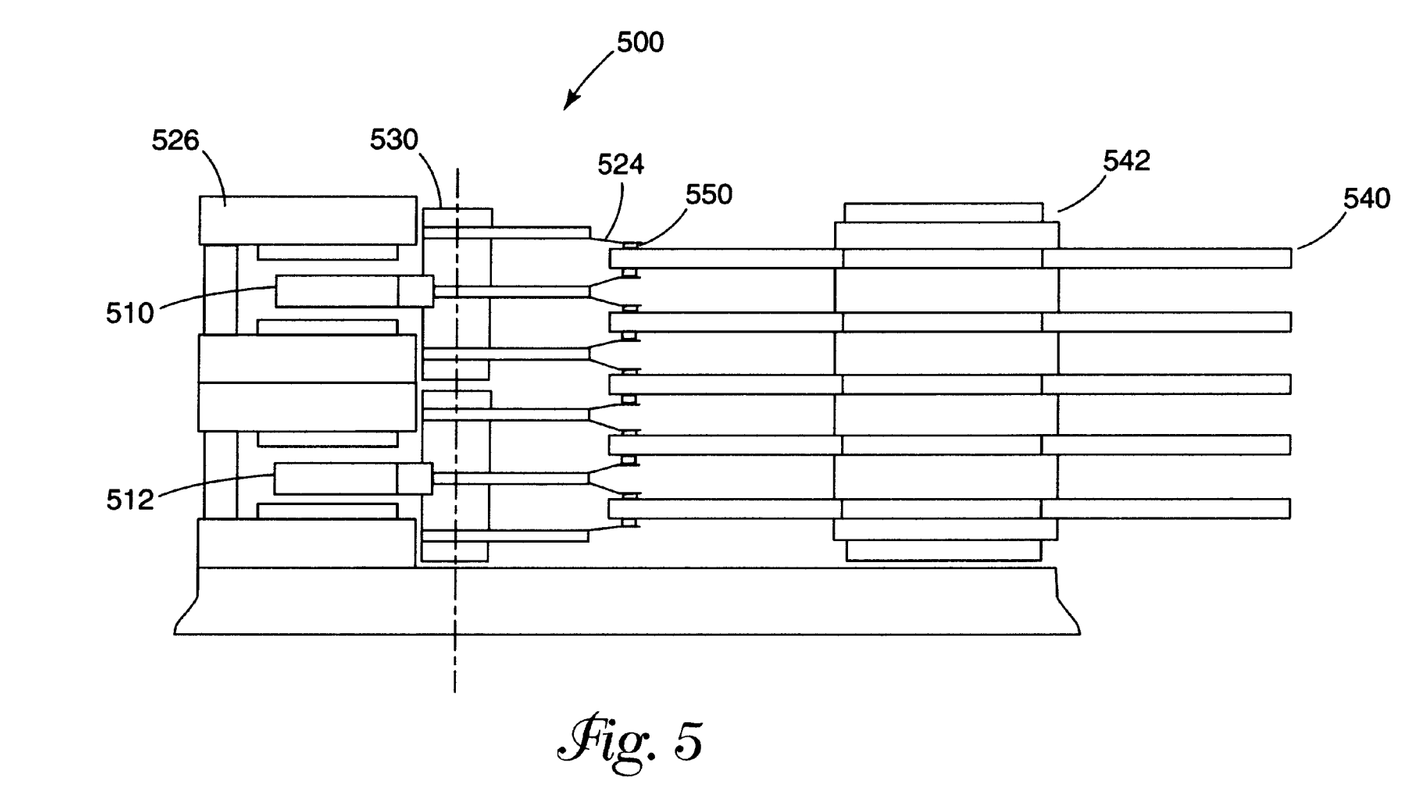
FIG. 5 illustrates a side view of the disk drive of FIG. 4.

FIG. 5 illustrates a side view 500 of the disk drive 400 of FIG. 4. FIG. 5 illustrates the head actuators 510, 512 positioned about the dual actuator pivot bearing system 530 according to the present invention to cause the heads 550 on the head gimbal assemblies 524 to be moved relative to the surfaces of the disks 540 in the disk stack 542. FIG. 5 also demonstrates the magnets' 526 relationship relative to the head actuators 510, 512.

Figure 6:
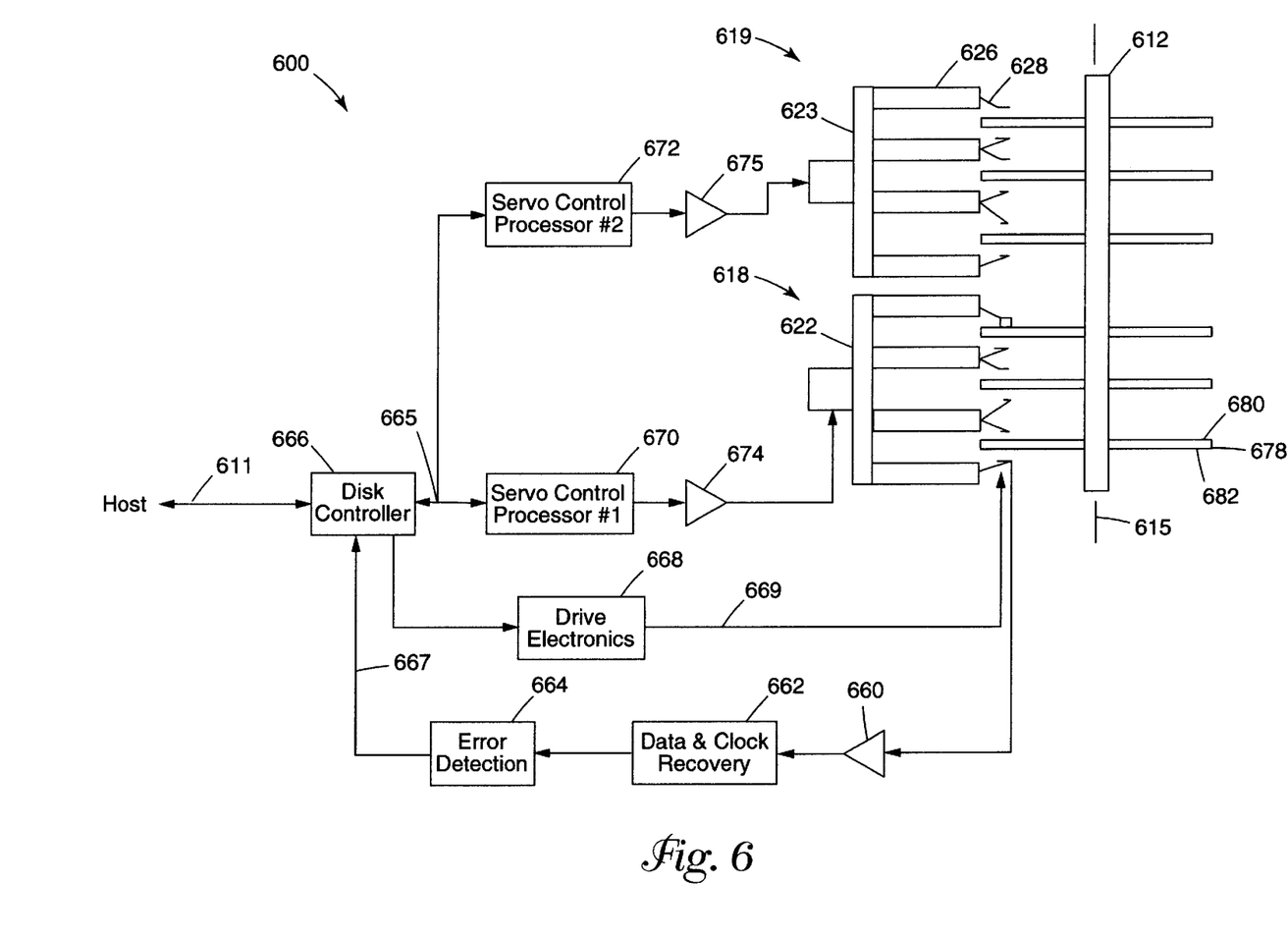
FIG. 6 is a block diagram of a disk drive providing control for two actuator assemblies.

FIG. 6 is a block diagram of a portion of a disk drive 600, which illustrates a dual servo control processor 670. In FIG. 6, the first 670 and second 672 servo control processors provide control signals to control the movement of dual actuators. However, those skilled in the art will recognize that the present invention is directed to the improved dual actuator pivot bearing system and method for making the improved dual actuator pivot bearing system rather than the method and apparatus for controlling the movement of the dual actuators. As such, those skilled in the art will recognize that the system illustrated herein for controlling the movement of dual actuators is being presented for illustration purposes only and that the invention is not meant to be limited by the description of the system for controlling the movement of the dual actuators.

The portion of disk drive 600 which is illustrated in FIG. 6 includes a first actuator assembly 618, a second actuator assembly 619, disk pack 612, preamplifier 660, data and clock recovery circuit 662, error detection circuit 664, drive controller 666, drive electronics 668, first servo control processor 670, second servo processor 672, first power amplifier 674 and second power amplifier 675.

Drive controller 666 is preferably a microprocessor or digital computer, or other suitable microcontroller, and is coupled by bus 611 to a host system or another drive controller which controls the drive.

Disk pack 612 includes spindle 676 which supports a plurality of coaxially arranged disks 678. Each disk 678 is mounted for rotation with spindle 676 about axis of rotation 615. Each disk 678 has a first surface 680 and a second surface 682. Surfaces 680 and 682 include concentric tracks for receiving and storing data in the form of flux reversals encoded on the tracks.

Actuator assemblies 618, 619 includes base portion 622, 623 each supporting a plurality of actuator arms 626. Each of the actuator arms 626 is coupled to at least one of the load beams 628. Load beams 628, in turn, each support one of the head gimbal assemblies 616 (labeled in FIG. 3) above corresponding disk surfaces 680 or 682 for accessing data within the tracks on the disk surface.

In operation, drive controller 666 typically receives a command signal from a host system which indicates that a certain portion of one or more of disks 678 are to be accessed. In response to the command signal, drive controller 666 provides servo control processor 670 with a position (or reference) signal 665 which indicates a particular cylinder over which one of actuator assemblies 618, 619 is to position a head gimbal assemblies 616. Servo control processors 670, 672 convert a position signal into an analog signal which is amplified by power amplifier 674, 675 and is provided to a voice coil motor in actuator assemblies 618, 619. In response to the analog position signal, actuator assemblies 618, 619 position load beams 628 and their associated head gimbal assemblies 616 over a desired cylinder.

The head gimbal assemblies 616 generate a read signal containing data from embedded servo position data which is stored on a selected portion of each track of the disk to be read, as well as normal data to be accessed from the selected portion of the disk to be read. The read signal is provided to preamplifier 660 which amplifies the read signal and provides it to data and clock recovery circuit 662. Data and clock recovery circuit 662 recovers data from the read signal, which is encoded on the disk surface when the data is written to the disk surface, in a known manner. Of course, data and clock recovery circuit 662 can be a partial response maximum likelihood (PRML) channel, or another suitable type of read channel.

Once the data is recovered, it is provided to error detection circuit 664 which detects whether any errors have occurred in the data read back from the disk and which provides an output 667. Errors are corrected by error detection circuit 664 or drive controller 666, or a combination of both, in a known manner.

During head positioning, drive controller 666 provides a position signal to servo control processors 670, 672 causing one of the actuator assemblies 618, 619 to position head gimbal assembly 616 over a selected cylinder. In a sector servo positioning drive (or an embedded servo positioning drive), a portion of each sector on the disk surfaces has position information which is encoded thereon and which is read by the data head and provided, through the read channel, to servo control processors 670, 672. The positioning information not only gives coarse position information indicating the particular track over which the data head is flying, it also provides tuning feedback to the servo control processor for better positioning. Servo control processors 670, 672 react to the position information read from the disk and positions the head gimbal assemblies 616 accordingly.

In order to write information to the disks, drive controller 666 receives not only the location of the information to be written on disk pack 612, but also receives the actual data to be written. The location information is provided to servo control processors 670, 672 as a reference signal to coarsely position the data heads relative to the corresponding disk surfaces. Then, drive controller 666 provides the data to be written to data conditioning circuitry 668, which in turn provides that information at an output 669 to the particular transducers on the head gimbal assemblies 616 so that the data can be written to the disk surfaces, in a known manner.

The read channel provided in disk drive 600 (which in the embodiment shown in FIG. 6 includes preamp 660, data and clock recovery circuit 662 and error detection circuit 664) is capable of receiving a plurality of simultaneous and parallel data signals and processing those data signals in parallel, and providing them to the host system, and/or drive controller 666 in parallel. Further, drive electronics 668 is also preferably suitable for providing a plurality of simultaneous and parallel write signals to the data heads to execute a simultaneous and parallel write operation. Further, servo controller processors 670, 672 are suitable for simultaneously providing positioning signals to actuators 618, 619 to simultaneously aligned a plurality of heads with tracks on a plurality of disk surfaces in disk pack 612.

The present invention eliminates the need for adhesive bonding and reduces assembly time of a dual actuator pivot bearing by press fitting together the components (bearings, shaft and sleeves). The dual actuator pivot bearing is toleranced and assembled to reduce or eliminate the need for adhesive bonding by press fitting together the components (bearings, shaft and sleeves), as will be described with reference to FIGS. 7–11 below. Accordingly, the present invention reduces outgassing from adhesive vapor and minimizes the assembly time.

Figure 7:
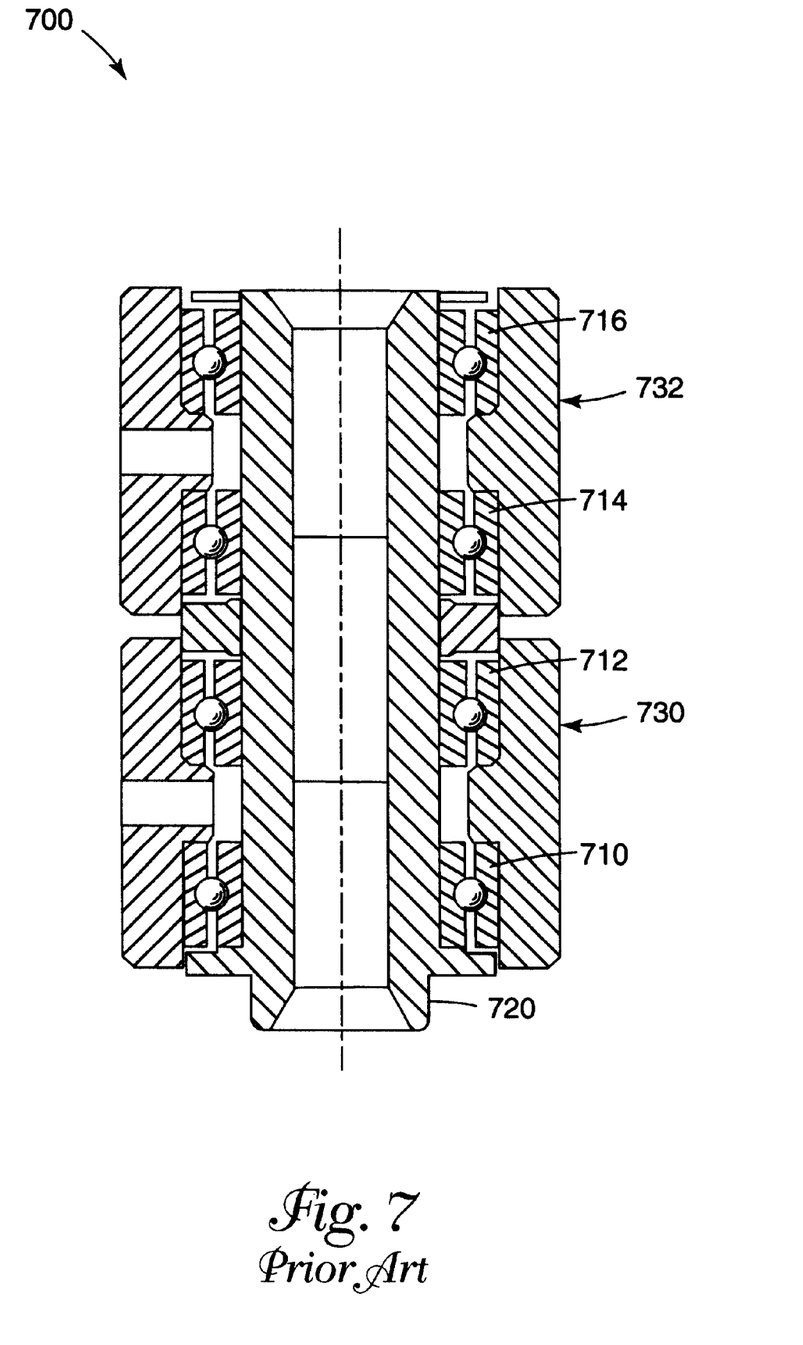
FIG. 7 illustrates a traditional dual actuator pivot.

FIG. 7 illustrates a traditional dual actuator pivot 700. The dual actuator pivot includes four ball bearings 710–716 which are adhesively bonded to shaft 720. Sleeves 730, 732 are bonded to the outer surfaces of ball bearings 710–716.

Figure 8A:
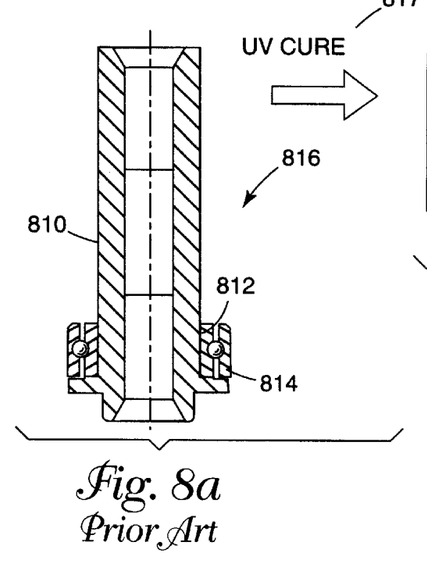
FIGS. 8a–g demonstrate the assembly process for the traditional dual actuator pivot.

FIGS. 8a–g demonstrate the assembly process for the traditional dual actuator pivot. In FIG. 8a, adhesive is dispensed onto the bottom of a shaft 810 at a first shaft location 812. A first ball bearing 814 is then inserted and adhesively bonded to the shaft at the first shaft location 812. This subassembly 816 is UV light cured 817.

Figure 8B:
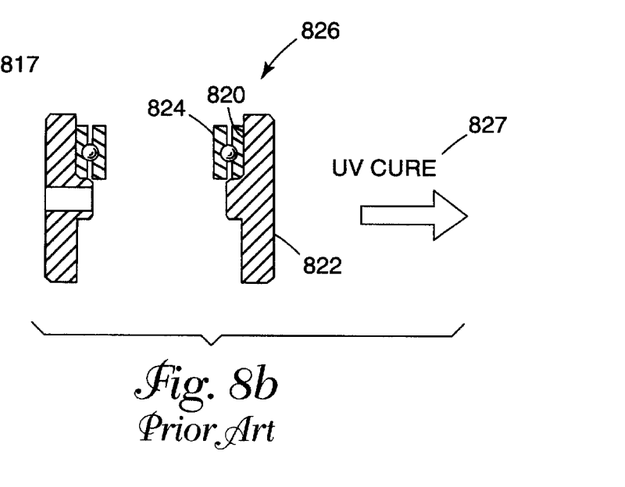

In FIG. 8b, adhesive is dispensed into the upper bore 820 of a first sleeve 822. A second ball bearing 824 is adhesively bonded to the first sleeve 822 at the upper bore 820. This subassembly 826 is then UV light cured 827.

Figure 8C:
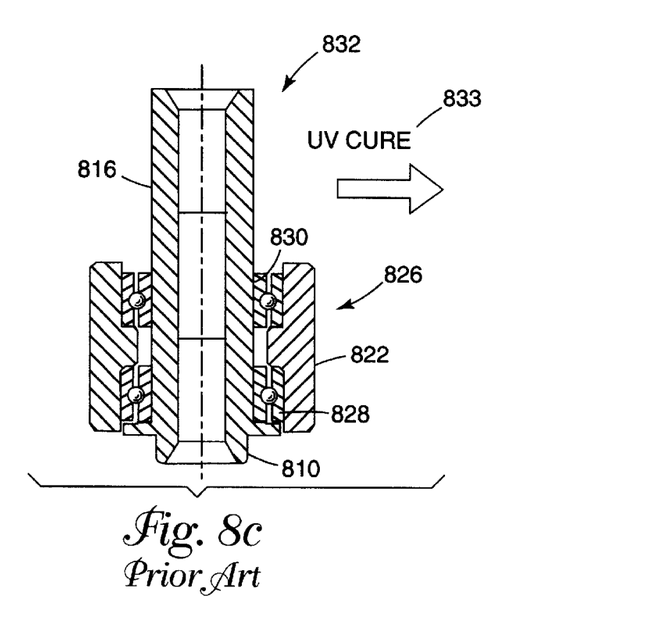

FIG. 8c shows adhesive dispensed into the bottom bore 828 of the first sleeve 822 and onto the shaft 810 at a second shaft position 830. This first bearing-sleeve subassembly 826 is then inserted and bonded to the shaft-bearing subassembly 816 and held under a preload for a predetermined time, e.g., 15 minutes. Then, the shaft-sleeve subassembly 832 is briefly UV light cured and then thermally cured 833 for a predetermined cure time and temperature, e.g., one hour at 600° C.

Figure 8D:
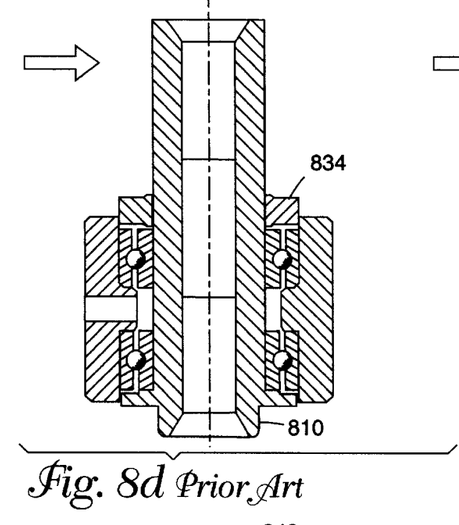
Figure 8E:
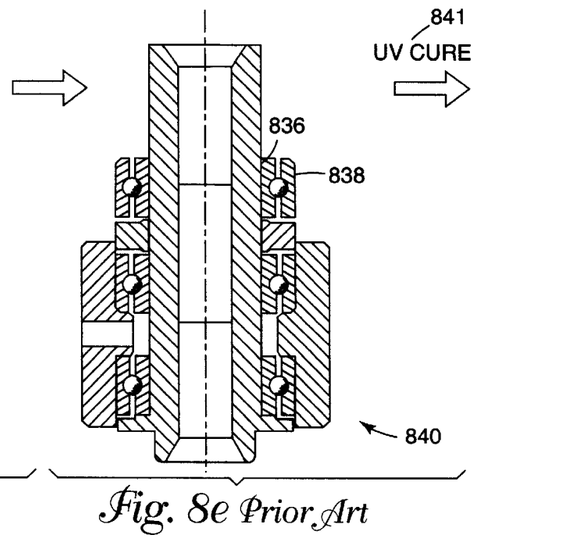

FIG. 8d shows a spacer 834 inserted over the shaft 810. FIG. 8e then illustrates adhesive dispensed onto the shaft at a third shaft location 836. A third ball bearing 838 is inserted and adhesively bonded to the shaft 810. This subassembly 840 is UV light cured 841.

Figures 8F, 8G:
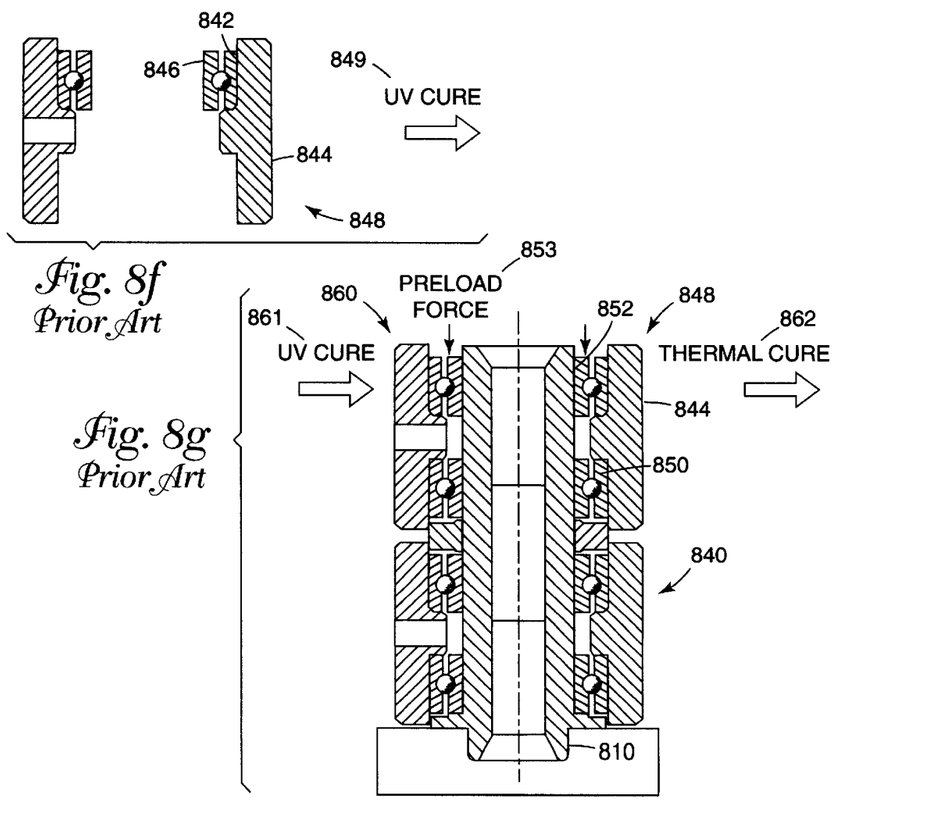

FIG. 8f illustrates adhesive dispensed into the upper bore 842 of the second sleeve 844. The fourth ball bearing 846 is adhesively bonded to the second sleeve 844 and this subassembly 848 is UV light cured 849.

FIG. 8g shows adhesive dispensed into the bottom bore 850 of the second sleeve 844 and onto the shaft 810 at a fourth shaft location 852. The second bearing-sleeve subassembly 848 is inserted and bonded to the shaft-bearing subassembly 840 and held under a preload 853 for a predetermined load time, e.g., 15 minutes. Then, the completed dual actuator pivot 860 is UV cured 861 and then thermally cured 862 for one hour.

Accordingly, the tradition dual actuator pivot and method requires twenty-one steps to complete. Outgassing potential is doubled because ball bearings are adhesively bonded to the shaft and sleeve. In addition, with twice as many adhesive joints as a single actuator pivot, the risk of having an adhesive bond fail with catastrophic results to the file is doubled.

Figures 9A, 9B, 9C, 9D:
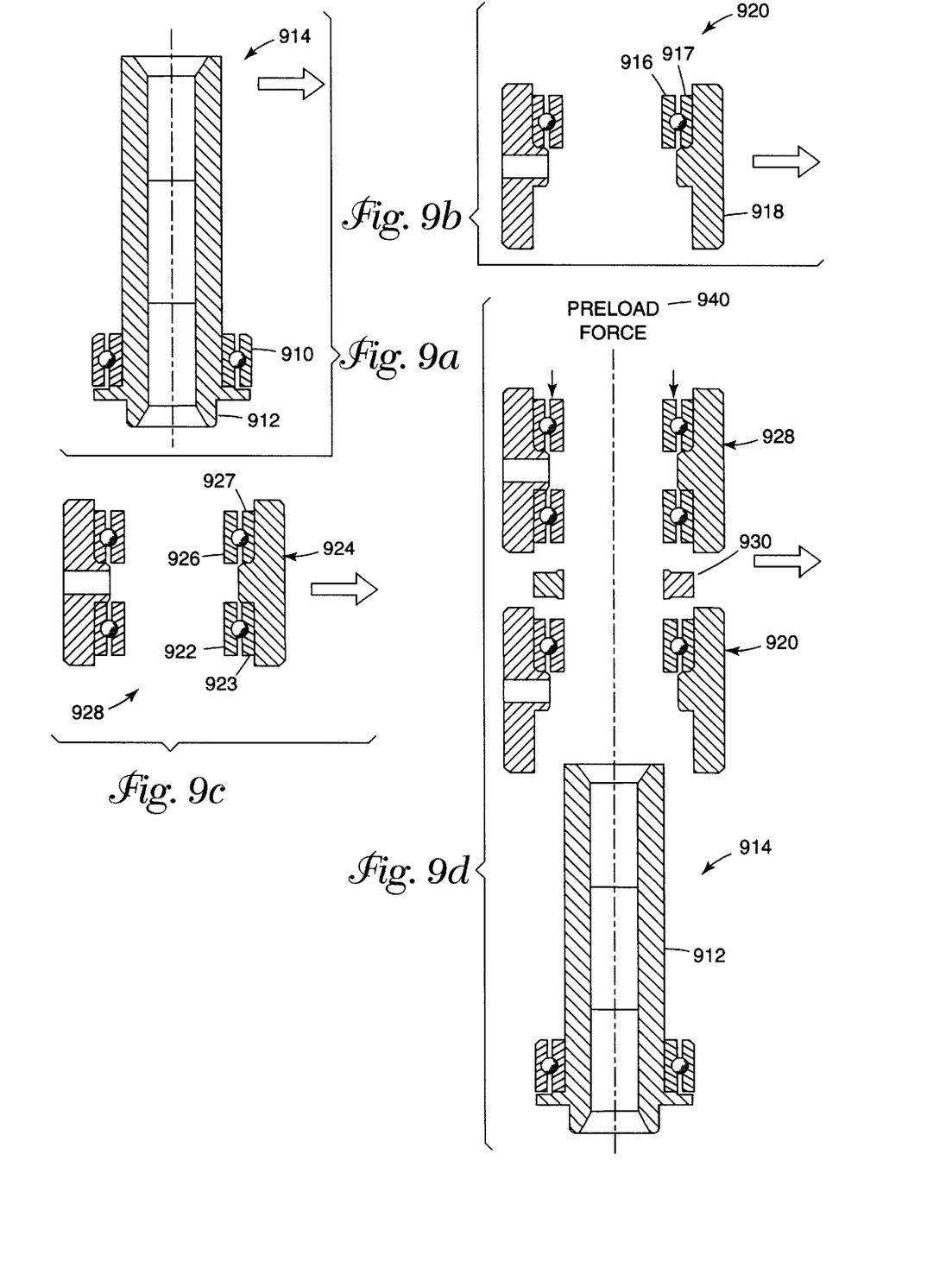
FIGS. 9a–d illustrate the method for making an improved dual actuator pivot according to the present invention.

FIGS. 9a–d illustrate the method for making an improved dual actuator pivot according to the present invention. The assembly of a dual actuator pivot according to the present invention requires only five steps as follows. FIG. 9a shows a first ball bearing 910 press fitted onto the shaft 912 to make a subassembly 914. FIG. 9b illustrates a second ball bearing 916 press fitted into a top bore 917 of a first sleeve 918 to make subassembly 920. FIG. 9c shows a third ball bearing 922 press fitted into a bottom bore 923 of a second sleeve 924. Fourth ball bearing 926 is press fitted into the top bore 927 of the second sleeve 924 to make a subassembly 928. FIG. 9d shows the shaft subassembly 914, first sleeve subassembly 920, spacer 930, and second sleeve subassembly 928 stacked for press fitting on the shaft 912. During press fitting an axial load 940 is applied while at the same time the pivot assembly is vibrated at a high frequency with low amplitude.

Figure 10:
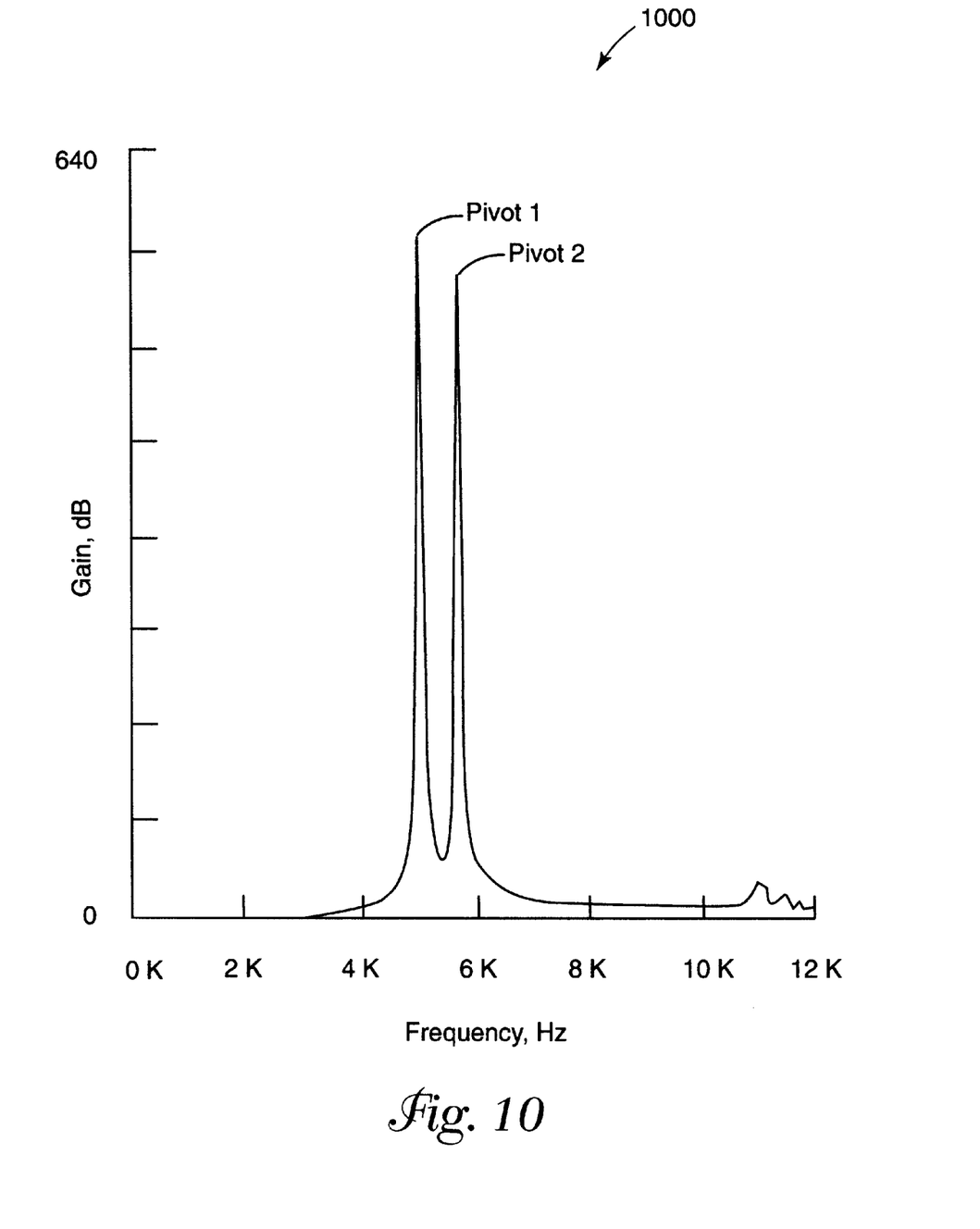
FIG. 10 illustrates an example of a frequency spectrum of axial resonance from the dual actuator pivot according to the present invention.

FIG. 10 illustrates an example of a frequency spectrum 1000 of axial resonance from the dual actuator pivot according to the present invention. To obtain the frequency spectrum 1000, a transducer is positioned on the assembly tool applying the axial load to make contact with the pivot sleeve to detect the natural resonance frequency of the pivots. The axial load is adjusted to achieve the specified natural frequency thus ensuring the correct preload, usually 1 to 2 pounds.

Referring to FIG. 9d again, in a second embodiment of the present invention the shaft 912 may first be chilled to shrink it, thus allowing the components to slide over the shaft into proper position. Then the preload is applied following component installation as the shaft warms and it regains its correct diameter. As this occurs the shaft will interfere with the ball bearing bores to create an interference fit joint having excellent integrity. Alternately the bearing, sleeve subassemblies can be heated to expand the bearing bores.

Figure 11:
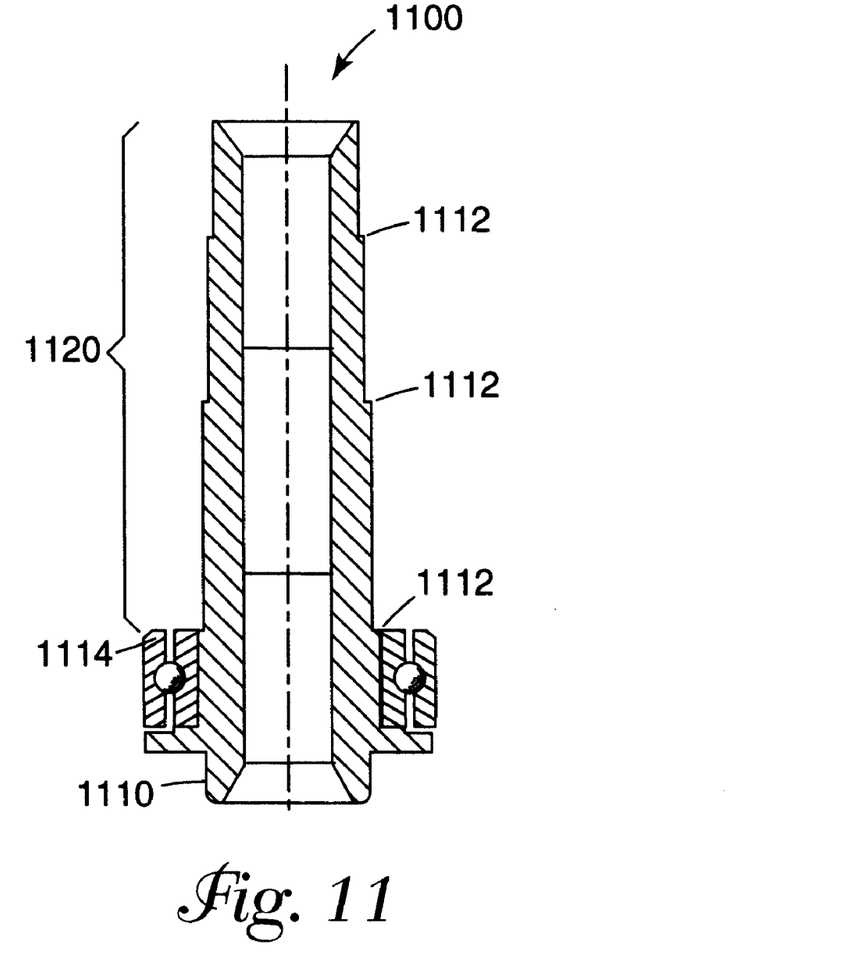
FIG. 11 illustrates a third embodiment of the dual actuator pivot according to the present invention.

FIG. 11 illustrates a third embodiment of the dual actuator pivot 1100 according to the present invention. In FIG. 11, the shaft 1110 is formed having steps 1112 and the bearing bore diameters are graded accordingly to match the steps 1112 from large to small going from the bottom to the top of the pivot so that the bearings (not shown) that may be placed at the bottom 1114 of shaft 1110 do not produce high frictional forces against the full length of the shaft 1110 during assembly. This is accomplished by not having the bearings engage in an interference fit over the first steps 1120 as the bearings slide down the shaft 1110. Consistent frictional forces over a short distance during assembly prevents galling of the components and will assure good quality.

Figure 12A:
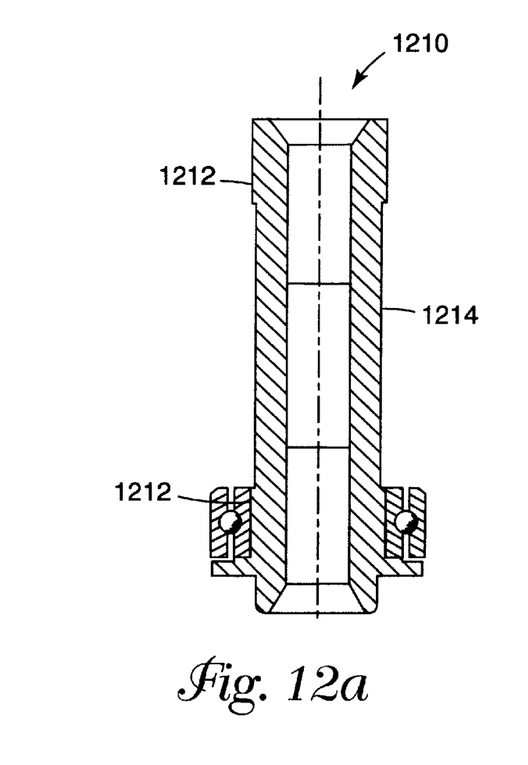
FIGS. 12a–12b illustrate a fourth embodiment of the dual actuator pivot according to the present invention.
Figure 12B:
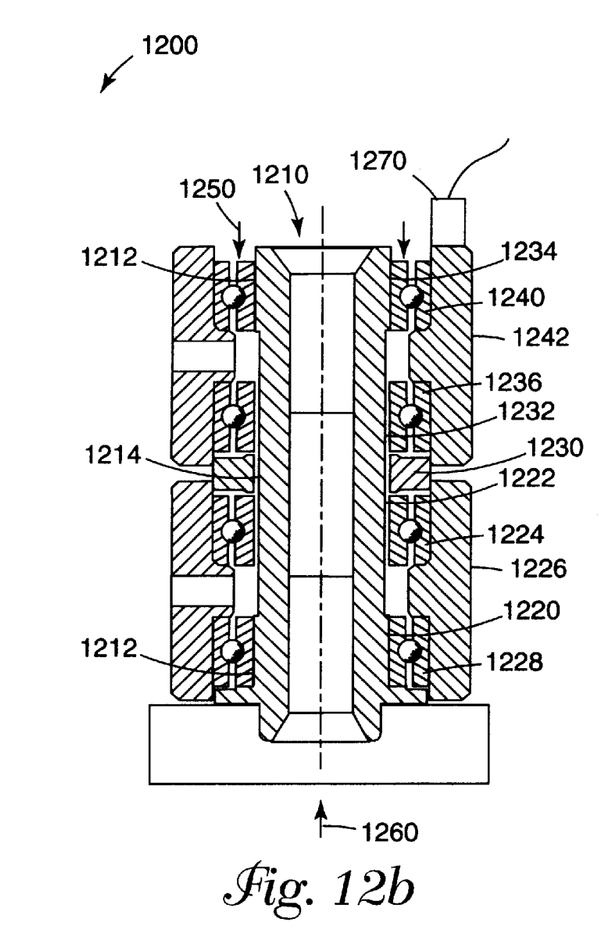

FIGS. 12a–b illustrate a fourth embodiment of an improved dual actuator pivot 1200 according to the present invention. In FIG. 12a, a flangeless shaft 1210 is shown with larger diameters 1212 at the ends. The larger diameters 1212 produce an interference press fit with the bores of the outer bearings. The flangeless shaft 1210 also includes a reduced diameter inner area 1214 for producing a snug slip fit for the inner bearings.

FIG. 12b illustrates the assembled dual actuator pivot 1200 of the fourth embodiment of the present invention. The bottom ball bearing 1220 is press fitted tight to the shaft 1210. The second ball bearing 1222 is press fitted snug onto the reduced diameter area 1214 of the shaft 1210. The second ball bearing 1222 is press fit tight in the top bore 1224 of the first sleeve 1226 and the first sleeve 1226 is slip fitted snug at a bottom bore 1228 of the first sleeve 1226 over the bottom bearing 1220. The spacer 1230 slip fits over the reduced diameter area 1214 of the shaft 1210. A third bearing 1232 is slip fitted snuggly over the reduced diameter area 1214 of the shaft 1210. The fourth ball bearing 1234 is press fitted tight onto the larger diameter area 1212 of the shaft 1210. The fourth ball bearing 1234 is also press fit tight in the top bore 1240 of the second sleeve 1242 and the second sleeve 1242 is slip fitted tight over the third bearing 1232 at the bottom bore 1236 of the second sleeve 1242.

The outer bearings 1228, 1234 hold the preload 1250 of the dual pivot, and therefore need a strong press fit. The middle of the shaft has the reduced diameter area 1214 so that the interference fit with the inner bearings 1222, 1232 provides a snug slip fit. A snug slip fit is required to keep the total frictional force of pressing the inner bearings 1222, 1232 low, thus preventing either damage to the system or producing a wide range of preloads 1250 between the upper and lower pivots. During press fitting an axial load 1250 is applied while at the same time the pivot assembly is vibrated 1260 at a high frequency with low amplitude. A transducer 1270 is used, as described above, to optimally set the preload 1250.

The foregoing description of the exemplary embodiments of the invention as been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive, comprising:

at least one rotatable disk;

at least first and second separately movable heads for providing transducing action with respect to the disk;

first and second head actuators, wherein the first head actuator provides radial movement of said first head relative to said disk and said second actuator provides radial movement of said second head relative to said disk, the radial movement provided by each actuator being separately controllable from that of the other actuator;

a dual actuator pivot for mounting the first and second actuators, the dual actuator pivot further comprising a first and a second actuator bearing assembly each having a sleeve and at least one bearing press fitted together, the first and second actuator bearing assemblies are press fitted to a shaft for rotatably securing the first and second head actuators respectively, wherein the first and a second actuator bearing assemblies further comprise an upper and lower ball bearing press fitted into a top and bottom bore of an upper sleeve respectively to form the first actuator bearing assembly and a lower sleeve having an upper ball bearing press fitted into a top bore of the lower sleeve to form the second actuator bearing assembly, the first and second actuator bearing assemblies being press fitted to the shaft assembly comprising the shaft having a ball bearing press fitted at a shaft base; and at least one controller, operatively coupled to the first and second head actuators for controlling the movement of the first and second head actuators about the dual actuator pivot, the at least one controller producing control signals to control the movement of the first and second actuators.

2. The disk drive of claim 1 further comprising a spacer disposed between the first and second actuator bearing assemblies.

3. The disk drive of claim 1 wherein the first and second actuator bearing assemblies are press fitted using a predetermined axial load.

4. The disk drive of claim 3 wherein the predetermined axial load is tuned to select a desired resonance frequency for the first and second actuator bearing assemblies.

5. The disk drive of claim 1 wherein the shaft comprises steps.

6. The disk drive of claim 5 wherein the steps are selected to have diameters matching bearing bore diameters graded from large to small going from a first end of the shaft to a second end of the shaft.

7. The disk drive of claim 6 wherein the steps match bearing bore diameters graded from large to small going from the bottom to the top of the shaft so that the bearings at the bottom of the shaft do not produce high frictional forces against the full length of the shaft during assembly.

8. The disk drive of claim 1 wherein the shaft is a flangeless shaft comprising large diameter areas formed at a first and second end of the shaft and a reduced diameter area between the large diameter areas.

9. The disk drive of claim 1 wherein the large diameter areas provide an interference press fit with the upper ball bearing press fitted into the top bore of the upper sleeve and with the bail bearing press fitted at the shaft base and provide a snug slip fit at the reduced diameter area for the lower ball bearing press fitted into the bottom bore of the upper sleeve and the upper ball bearing press fitted into the top bore of the lower sleeve.

10. The disk drive of claim 1 wherein the first and second bearing assemblies are press fit onto the shaft using a predetermined axial load to achieve a desired preload.

11. A dual actuator pivot, comprising a first and a second actuator bearing assembly each having a sleeve and at least one bearing press fitted together, the first and second actuator bearing assemblies are press fitted to a shaft for rotatably securing first and second head actuators respectively, wherein the first and second actuator bearing assembles further comprise an upper and lower ball bearing press fitted into a top and bottom bore of an upper sleeve respectively to form the first actuator bearing assembly and a lower sleeve having an upper ball bearing press fitted into a top bore of the sleeve to form the second actuator bearing assembly, the first and second actuator bearing assemblies being press fitted to a shaft assembly comprising the shaft having a ball bearing press fitted at a shaft base.

12. The dual actuator pivot of claim 11 further comprising a spacer disposed between the first and second actuator bearing assemblies.

13. The dual actuator pivot of claim 11 wherein the first and second actuator bearing assemblies are press fitted using a predetermined axial load.

14. The dual actuator pivot of claim 13 wherein the predetermined axial load is tuned to select a desired resonance frequency for the first and second actuator bearing assemblies.

15. The dual actuator pivot of claim 11 wherein the shaft comprises steps.

16. The dual actuator pivot of claim 15 wherein the steps are selected to have diameters matching bearing bore diameters graded from large to small going from a first end of the shaft to a second end of the shaft.

17. The dual actuator pivot of claim 16 wherein the steps match bearing bore diameters graded from large to small going from the bottom to the top of the shaft so that the bearings at the bottom of the shaft do not produce high frictional forces against the full length of the shaft during assembly.

18. The dual actuator pivot of claim 11 wherein the shaft is a flangeless shaft comprising large diameter areas formed at a first and second end of the shaft and a reduced diameter area between the large diameter areas.

19. The dual actuator pivot of claim 18 wherein the large diameter areas provide an interference press fit with the upper ball bearing press fitted into the top bore of the upper sleeve and with the ball bearing press fitted at the shaft base and provide a snug slip fit at the reduced diameter area for the lower ball bearing press fitted into the bottom bore of the upper sleeve and the upper ball bearing press fitted into the top bore of the lower sleeve.

20. The dual actuator pivot of claim 11 wherein the first and second bearing assemblies are press fit onto the shaft using a predetermined axial load to achieve a desired preload.

* * * * *

UNITED STATES PATENT AND TRADEMARK OFFICE
CERTIFICATE OF CORRECTION

PATENT NO. : 6,603,640 B1
DATED : August 5, 2003
INVENTOR(S) : Prater et al.

It is certified that error appears in the above-identified patent and that said Letters Patent is hereby corrected as shown below:

Column 3,
Line 2, "a" should read -- an --.

Column 4,
Line 2, "a" should read -- an --.

Column 8,
Line 25, "600º" should read -- 60º --.

Signed and Sealed this

Twenty-second Day of June, 2004

JON W. DUDAS
*Acting Director of the United States Patent and Trademark Office*